United States Patent
Pavelle et al.

(10) Patent No.: US 9,294,680 B1
(45) Date of Patent: Mar. 22, 2016

(54) MOTORIZED ROTATING LINEARLY POLARIZED OPTICAL DEVICE

(71) Applicants: Richard Pavelle, St. Augustine, FL (US); Paul Burstein, Winchester, MA (US)

(72) Inventors: Richard Pavelle, St. Augustine, FL (US); Paul Burstein, Winchester, MA (US)

( * ) Notice: Subject to any disclaimer, the term of this patent is extended or adjusted under 35 U.S.C. 154(b) by 0 days.

(21) Appl. No.: 14/684,684

(22) Filed: Apr. 13, 2015

Related U.S. Application Data

(60) Provisional application No. 61/979,292, filed on Apr. 14, 2014.

(51) Int. Cl.
  *G02B 27/28* (2006.01)
  *H04N 5/225* (2006.01)
  *H04N 5/232* (2006.01)

(52) U.S. Cl.
  CPC .......... *H04N 5/23296* (2013.01); *G02B 27/281* (2013.01); *H04N 5/2254* (2013.01); *H04N 5/23293* (2013.01)

(58) Field of Classification Search
  CPC ............ H04N 5/23296; H04N 5/2254; H04N 5/23293; H04N 2201/02493; G02B 27/281
  See application file for complete search history.

(56) References Cited

U.S. PATENT DOCUMENTS

| | | | | |
|---|---|---|---|---|
| 5,264,916 A | * | 11/1993 | Bushman | 356/364 |
| 5,404,225 A | * | 4/1995 | Bushman | 356/364 |
| 5,414,476 A | | 5/1995 | Pavelle et al. | |
| 5,557,261 A | * | 9/1996 | Barbour | 340/580 |
| 7,713,148 B2 | | 5/2010 | Sweeney | |
| 8,059,275 B1 | * | 11/2011 | Pinhasov | 356/364 |
| 8,358,413 B1 | * | 1/2013 | Pinhasov | 356/364 |
| 8,449,409 B1 | | 5/2013 | Barkley | |
| 8,823,934 B2 | * | 9/2014 | Chhibber et al. | 356/366 |
| 8,908,081 B2 | * | 12/2014 | Davis et al. | 348/342 |
| 2011/0211047 A1 | * | 9/2011 | Chhibber et al. | 348/47 |
| 2011/0221779 A1 | * | 9/2011 | Okumura et al. | 345/649 |
| 2012/0062845 A1 | * | 3/2012 | Davis et al. | 352/45 |
| 2012/0105598 A1 | * | 5/2012 | Hiramoto et al. | 348/49 |

\* cited by examiner

*Primary Examiner* — Nicholas Giles
(74) *Attorney, Agent, or Firm* — Jerome E Sacks

(57) ABSTRACT

The present invention provides a polarizer that is motorized and rotates and is attached to the front of a digital camera. A series of images of a scene is acquired with the polarizer whose orientation is changed in a in a systematic sequence from 0 degrees to 180 degrees. The polarized images are processed to present a final image or set of images that amplify the net polarizations inherent in the light scattered or reflected by the various pixels in the scene. Multiple embodiments are given, including an embodiment implemented on a standard smartphone, one implemented on a miniature camera system mounted on a pair of glasses, and an embodiment on a system utilizing two synchronized camera systems mounted on a pair of eyeglasses.

9 Claims, 5 Drawing Sheets

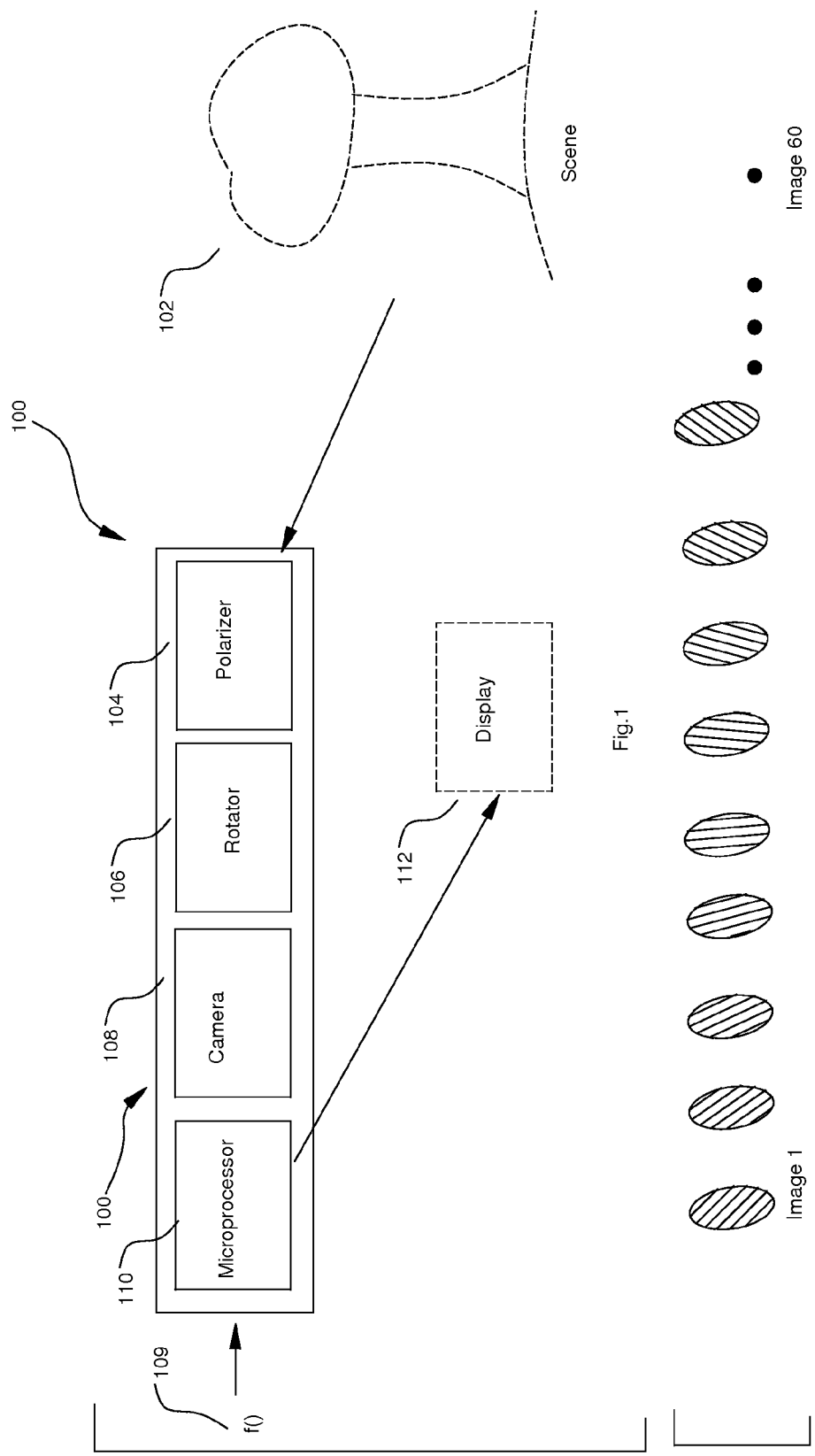

MOTORIZED ROTATING LINEARLY POLARIZED OPTICAL DEVICE

This application claims the benefit of the U.S. Provisional Patent Application No. 61/979,292 filed Apr. 14, 2014 by the present inventors. This provisional patent application is incorporated herein by reference.

BACKGROUND OF THE INVENTION

1. Field of the Invention

The present invention relates to the field of optical elements that are polarized, and more particularly to a controlled rotating linearly polarized optical element used on a digital camera or Smartphone or any device or means capable of acquiring and, in most cases, processing digital images. The object of the invention is to create enhanced views of scenes that maximize the appearance of the net polarization of light that is reflected or scattered to an observer from the various elements within the scene, or to render the net polarization in the scene amenable to automatic detection of features of interest within the image.

2. Description of Related Art

As can be seen by reference to the following U.S. Pat. Nos. 8,449,409; 7,713,148; 5,414,476; and JP2004317124A2; JP10148521A2; and WO2009128340A1, the prior art is replete with myriad devices designed to enhance certain characteristics of scenes, making them far more apparent to the user.

Normal visible light has a component, referred to as the electric vector that is usually oriented in a random direction that is perpendicular to the path of the light beam. Polarized material allows only that light that has its electric vector oriented parallel to a preferential direction to pass through the material. This is analogous to a rope in a picket fence. Without the fence one can create wave motion in the rope horizontally, vertically or any angle in between, representative of the randomness of the wave states. But, if the rope goes through the fence, all horizontal motion is damped by the presence of the fence while the vertical is not.

Light that does not have its electric vector more or less parallel to that direction will be absorbed. Light that passes through such a polarized filter has all its electric vectors aligned in one direction, and is said to be polarized. The fraction of light that is absorbed is proportional to the cosine of the angle between the electric vector of the light and the preferential direction. As in conventional polarized sunglasses, each polarized lens has a preferential direction for light filtering. In conventional fixed-mount polarized sunglasses, the polarized preferential direction is vertical for both eyes. This allows light that has its electric vector oriented vertically to pass through unattenuated, light that has been reflected from horizontal surfaces, e.g., a car hood, or the road surface or the water's surface tends to have its electric vector oriented horizontally, and is thus preferentially absorbed by the polarized lens. This is the reason that conventional polarized sunglasses are so efficient at reducing reflected glare.

Many other situations result in different net polarizations of light reflected from various surfaces. Polarization differences in a scene are indicative of differences in the reflecting or scattering surfaces, differences that are not apparent without somehow enhancing the small differences in polarization, to which the eye is not sensitive. These differences include, for instance, light reflected from a golfing green, with different polarizations indicative of different types of grass, or subtle undulations in the green itself. We shall use golf and golfers as examples throughout this application, though it is understood that the principles are universally applicable.

To reiterate, the important point is that humans and the unaided human eye are not sensitive in any way to the net polarization of a scene; having an eye that is sensitive to net polarization would be analogous to the difference between seeing in black and white and seeing in color.

While all of the aforementioned prior art constructions are adequate for the basic purpose and function for which they have been specifically designed, they are uniformly deficient with respect to their failure to provide a simple, efficient, and practical optical element that maximizes and displays the polarization differences that are inherent in any particular scene. In its simplest form, our approach posits a motorized rotating optical polarizing element for use on a digital camera or a Smartphone.

By "motorized" we mean any remotely or automatically controlled or programmed device that changes the preferential filtering direction of a linearly polarizing optical element. The term "linearly polarizing optical element" applies to both the familiar physical forms of polarizer, e.g., the common plastic Polaroid filters, as well as to electronic devices, e.g., those based on Pockels cells, for instance. By "camera" we mean any device or system that is capable of acquiring an image and storing it digitally. Cameras usually have an optical lens, but the term "camera" can include any image formation device, e.g., a telescope minor. The term "microprocessor" means any computing device having a memory capability and computer code that receives digital image input and can output data generated by the computer code. If a capital letter such as P(i) is used to represent digital image number i in a sequence of digital images, then P(i, m, n) represents the individual pixel of P(i) in row m column n.

This new and improved motorized rotating linearly polarized optical element and its ability to present maximum net polarization, or any function of net polarization, inherent in any scene is a stated object of the present invention.

BRIEF SUMMARY OF THE INVENTION

The present invention provides at its most basic form, a polarizing optical device that is motorized and rotates about the optical axis, and is attached to the front of a digital camera. The camera acquires images with the angle of polarization at a series of different values. The images are processed in such a way to detect, show, and enhance maximum polarization differences across the field of view.

BRIEF DESCRIPTION OF THE SEVERAL VIEWS OF THE DRAWINGS

These and other attributes of the invention will become more clear upon a thorough study of the following description of the various modes for carrying out the invention, particularly when reviewed in conjunction with drawings, wherein:

FIG. 1 is a functional view of the motorized rotating linearly polarized optical device of the first embodiment.

FIG. 2 is view of 60 polarization angles of the digital images acquired in the first embodiment.

DETAILED DESCRIPTION OF THE INVENTION

Figure 3:
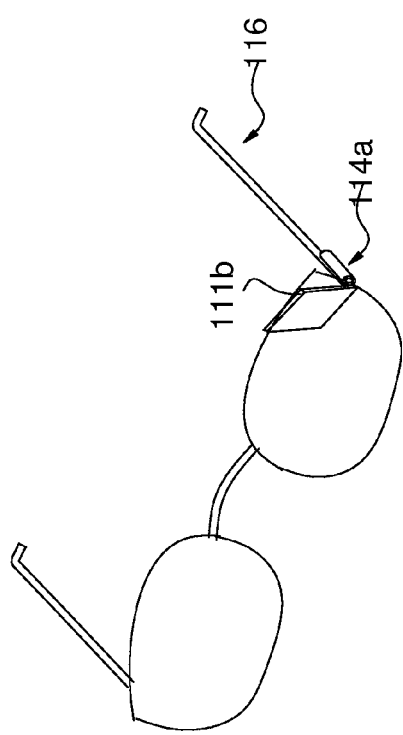
FIG. 3 is a perspective view of the motorized rotating linearly polarized optical device mounted on a shaft of a pair of eyeglasses of the second embodiment.

In general, polarized images may be acquired at different rotation angles, processed, and combined in one of any of a number of ways, ranging from simple subtraction of images acquired with two or more perpendicular polarizations to a more detailed maximization, or any other image processing function, of the differences in all the images.

In the first embodiment, illustrated in FIG. 1, the motorized rotating linearly polarized optical device 100 is comprised of a camera 108, a polarizer, 104 a rotator motor 106, and a microprocessor 110. The microprocessor 110 controls the rotator motor 106 which rotates the polarizer 104. The camera in the first embodiment has a spatial resolution corresponds to a scene pixel resolution of roughly VGA type quality, 640× 480 pixels or better. This is simply an example. Finer or coarser resolutions would also obtain. The motorized rotating linearly polarized optical device 100 takes a series of 60 successive positions in order to acquire 60 images P(i), i=1 to 60 of scene 102. FIG. 2 illustrates the polarization angle of the 60 images. The number of views may be varied as well. Note that cameras with this VGA or better resolution are currently found in almost all state of the art smartphones.

The first embodiment performs the following four steps, data acquisition, image subtraction and processing, image feature maximization, and display. One algorithm is presented as an example:

Step 1: Camera 108 acquires 60 digital images P(i) of a scene 102, illustrated in FIG. 1 over a rotation of 180 degrees, 3 degrees separating successive polarized angle views. The rotator motor 106 rotates the polarizer 104, and the resulting successive polarized digital images P(i) are sent to the camera 108, which are then transmitted to the microprocessor 110. In the first embodiment, R=640, and S=480.

Step 2: Image processing software hosted in the microprocessor 110 interfacing with the camera 108 then calculates 30 difference digital images D(i), i=1, 30, by subtracting images taken 90 rotational degrees apart. Hence digital image D(1) is obtained by subtracted, pixel by pixel P(1) from digital image P(31), resulting in polarized difference digital image D(1). Digital image D(2) is calculated by subtracting P(2) from digital image P(32), resulting in polarized difference digital image D(2), etc. The result is 30 polarized difference digital images: D(1), D(2) . . . , D(30). Each difference digital image D(i) is an array of pixels P(i, n, m)−P(i+30, n, m), n=1, 2, . . . , R, m=1, . . . , S, where P(i, n, m) are the pixels in P(i). In embodiment 1, R=640, S=480 and i=1, 2, . . . N where N=30. It is noted that the common image processing conditioning steps, e.g., normalization, boundary condition matching, are not specifically enumerated here, but are common and employed in standard practice.

Step 3: For each difference digital image, D(i), i=1,2, . . . 30, the scalar Q(i), i=1 to 30 is calculated as the sum of the squares of the individual elements D(i, m, n) in each difference digital image D(i), i.e:

$$Q(i)=D(i,1,1)2+D(i,1,2)2+\ldots+D(i,R,S)**2.$$

Step 4: The microprocessor 110 computes the maximum difference digital image D(I) where I has the largest value Q(i), i=1, . . . 30 and transmit the resulting digital image D(I) to the display 112. This completes the process.

If this process is done on a putting green, the maximum difference image D(I) of the putting green is therefore presented to the golfer. This image makes clear differences in vegetation, cut of green, etc. If this process is accomplished on a military scene, camouflaged equipment, e.g., vehicles and artillery pieces, as well as the camouflaged fabric on uniforms, may well present an image of net polarization that differs substantially from the background.

Alternate embodiments are consistent with the inventive concept presented herein. As shown in FIG. 1, a function f(D(i,j,k)) 109. In embodiment 1 f( ) is the sum of squares function Q(i) shown above. In other embodiments, function f may be any function of the array of difference pixels D(i, j,k,), i=1 through N, j=1 through R, k=1 through S. Many functions f are well known in the field of digital image processing. Furthermore, more generally, the integers N, R and S may be any positive integers, each at least 2 although it is unlikely that N will be less than 30 and R and S will be less than those of a VGA scenario. Typically the function f is chosen based on the objective of the device, e.g., viewing a camouflaged target, or looking at a putting green. The function f for a particular application is often determined by extensive testing of many potential candidate functions.

Figure 4:
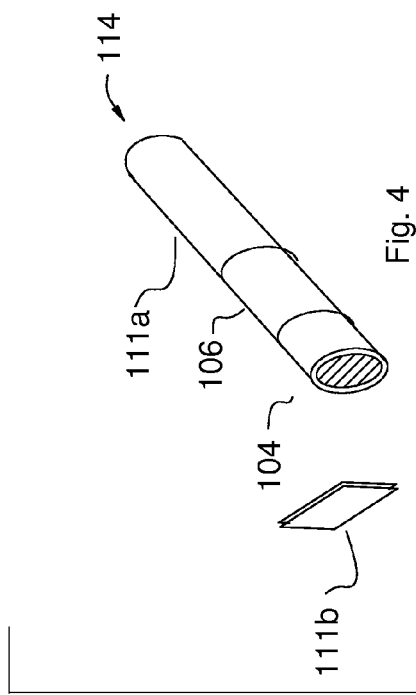
FIG. 4 illustrates a miniature eyeglass mounted camera system of the second embodiment.

FIGS. 3 and 4 illustrate a second embodiment. The miniature eyeglass mounted camera system 114 of the second embodiment is a miniaturized unit that is mounted on one of the temple pieces of a pair of eyeglasses 116. In this embodiment, the miniature eyeglass mounted camera system 114 has a processing component 111a and a display component 111b. An example of a miniature eyeglass mounted camera system 114 is Google Glass™. A polarizer, 104 and a rotator motor 106 are installed on the front of the processing component 111a. The processing component 111a has customized code (not shown in FIG. 4) that controls the rotator motor 106. The polarizer 104 transfers successive digital images P(i), i=1, . . . 60 to customized code in the processing component 111a. The processing component 111a computes the maximum difference digital image D(I) and sends it to the display component 111b where the resulting image can be viewed by the user.

Figure 5:
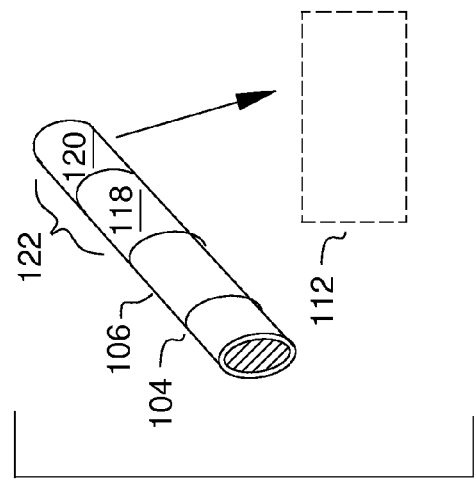
FIG. 5 illustrates the third embodiment where the motorized rotating linearly polarized optical device is hosted in a device such as Google Glass™.

FIGS. 3 and 5 illustrate a third embodiment. In the third embodiment, the polarizer, 104 and a rotator motor 106 are mounted in front of a customized camera 122 that has a camera component 118 and a microprocessor component 120. The microprocessor component 120 controls the rotator motor 106 which rotates the polarizer 104. The camera component 118 send the successive digital images P(i), i=1, . . . 60 to the customized code located in the microprocessor component 120. The microprocessor component 120 computes the maximum difference digital image D(I) where I has the largest value Q(i), i=1, 30 and transmits the resulting digital image D(I) to the display 112. This completes the process.

Alternate embodiments of embodiments one through three are consistent with the embodiments presented herein. The number of pixels can be greater or less then the VGA example above. The microprocessor 110 and display 112 may or not be part of the motorized rotating linearly polarized optical device. The number of difference digital images D(i) can be greater than or less than 30. The algorithm may be different from the sample shown here.

Figure 6:
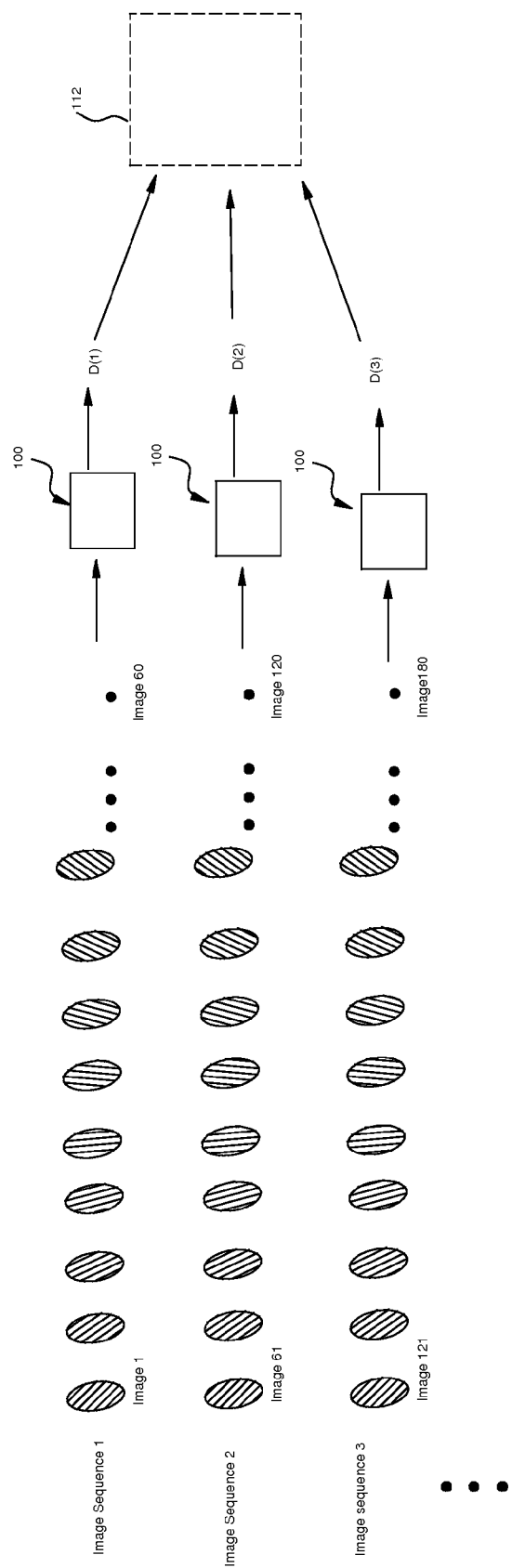
FIG. 6 Illustrate a fourth embodiment involving motion picture enhancement of the first embodiment.

The fourth embodiment: the motion picture embodiment. Sequence of digital images D(I,1), D(I,2), . . . are displayed, where the second index refers to the particular sequence in which that image set was acquired. Referring to FIG. 6, this embodiment is an enhancement of the first embodiment.

Instead of transmitting a single maximum difference digital image, D(I), representing the single digital image obtained from 60 polarized digital images P(i), i=1 to 60, successive difference digital images D(I,1), D(I,2) D(I,3) are processed by the motorized rotating linearly polarized optical device 100 and are transmitted and displayed on display 112, thereby displaying a motion picture of difference digital images D(I), 1=1,2, . . . . FIG. 6 illustrate processing three of the digital images D(I).

Alternate embodiments of the fourth embodiment displays the sequence of digital images D(I,1), D(I,2) . . . on different camera systems, for example the second or the third embodiment.

Figure 7:
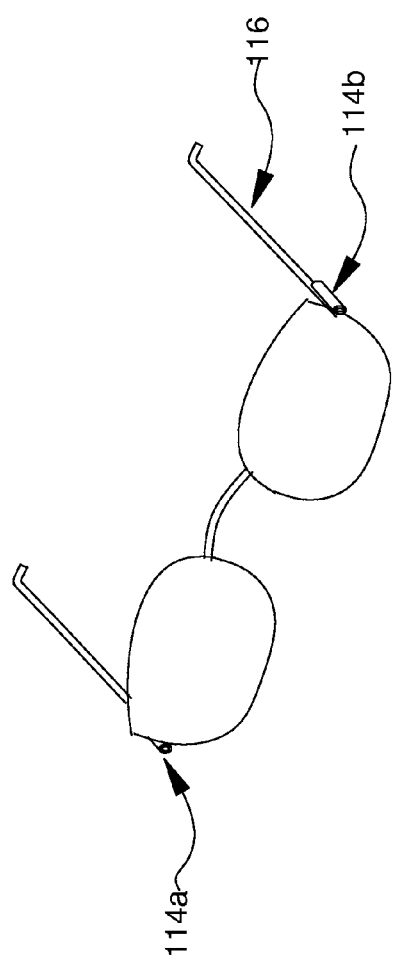
FIG. 7 and FIG. 8 illustrate a fifth embodiment implementing two synchronized cameras.
Figure 8:
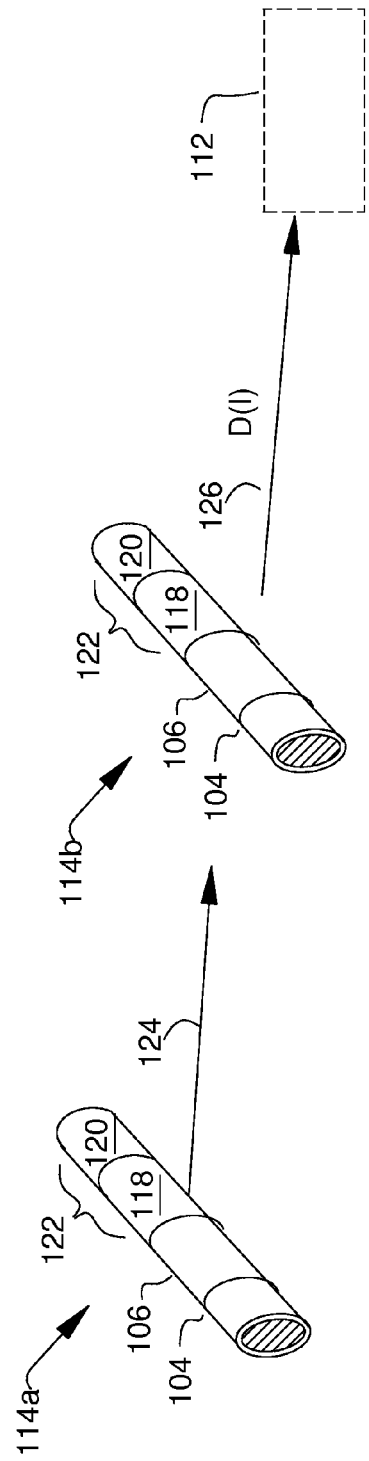

The fifth embodiment: the two camera embodiment. The fifth embodiment, shown in FIGS. 7 and 8, involves the use of two miniature eyeglass mounted camera systems 114a and 114b (see FIG. 7) with coordinated rotating polarizers This embodiment, based on the third embodiment, requires a relatively careful alignment of the two miniature eyeglass mounted camera systems 114a and 114b. In this embodiment both digital images are taken simultaneously, for example P(1) and P(31) are taken simultaneously, P(2) and P(32) are take simultaneously, etc. The major advantage is that the pairs of perpendicularly polarized digital images are acquired at the same time. Compare this to the first and second embodiments, where the perpendicularly polarized digital images are obtained 30 frames apart, so significant movement between digital images either in the scene itself, or by motion or orientation change of the camera can spoil the technique if there is no compensation for these digital image differences. This fifth embodiment avoids this problem.

Referring to the fifth embodiment (see FIG. 8) the microprocessor component 120 of the first customized camera system 114a transmits synchronization signal 124 and the difference digital image D(i) to the second customized camera system 114b. The second customized camera system 114b computes the maximum difference digital image D(I) and transmits the image signal 126 D(I) to the display 112.

Figure 9:
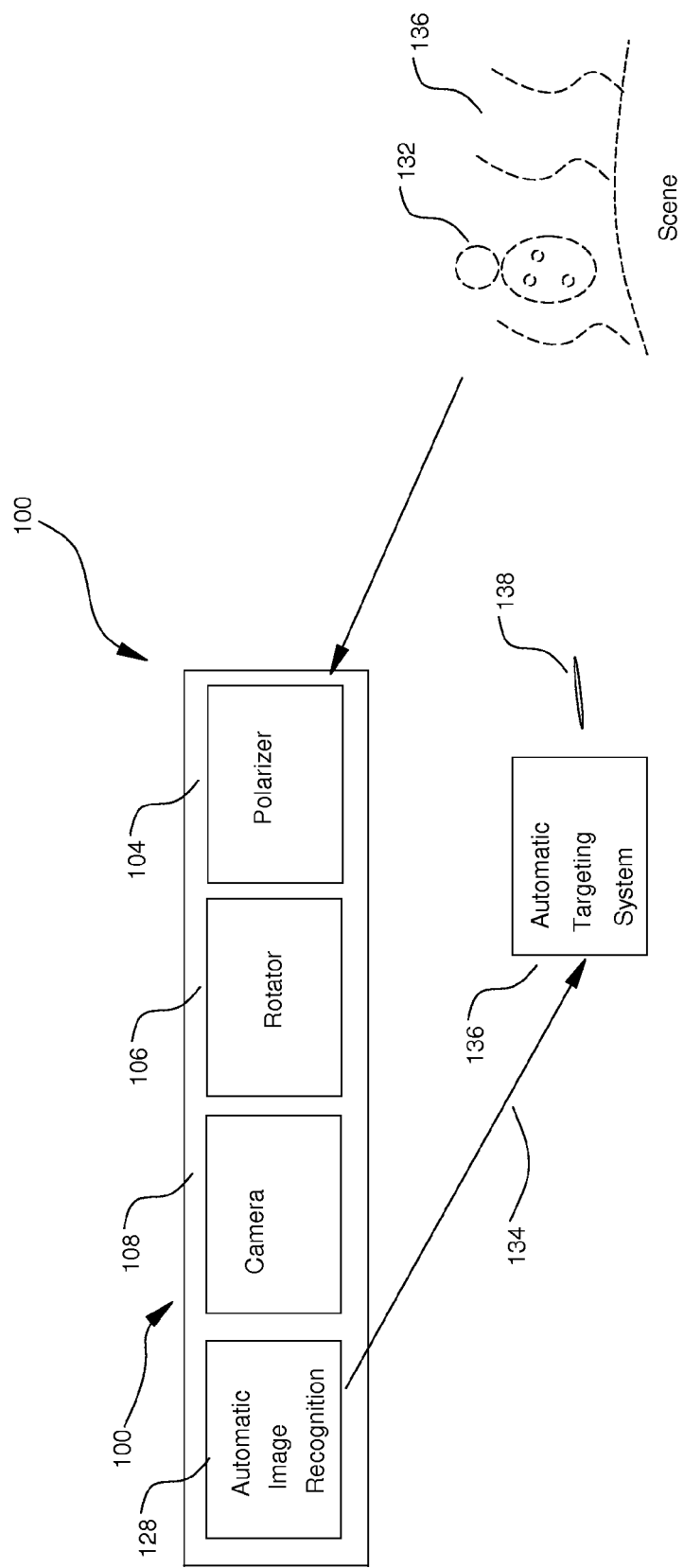
FIG. 9 illustrates a sixth embodiment implementing an automated weapon system.

FIG. 9 illustrates a sixth embodiment of the current invention. Only the changes between this embodiment and the first embodiment are discussed herein in detail. The main differences between the first embodiment and the sixth embodiment is that the sixth embodiment does not have a display 112 and does not have a human in the loop. The microprocessor 110 of the first embodiment is replaced by a customized automatic image recognition system 128. The customized automatic image recognition system 128 is designed to identify specific targets such as a camouflaged person 132 hiding among foliage 140. The customized automatic image recognition system 128 when a camouflaged person 132 is identified, it communicates the camouflage person coordinates 134 of the camouflaged person 132 to an automated targeting system 136 which targets the camouflage person coordinates 134 and fires a missile 138 at the camouflaged person 132.

Alternate embodiments of the sixth embodiment may be implemented. A human with a display may be included to make a decision whether to fire the missile. Instead of targeting a camouflaged person 132, it could target an animal. Instead of firing a missile 138, it could take a picture of the animal.

The present invention is advantageous for use in sport-oriented activities, where accentuating subtle changes in scene provides major change in awareness. For example, in golf, even the most subtle undulations in the green and changes in vegetation become readily observable. In sailing, differences in water surface due to current or wind(e.g., "cat's paw" swirl of water) become much more apparent. Further, for hunting animals whose color schemes blend into the background, the animal as seen in polarized light will appear to stand out. In skiing, ice shows up very clearly, as do moguls and holes. In driving, black ice would show up very clearly on otherwise clear roadways. For use when piloting an airplane, the appearance of changes in the sky scene, e.g., an approaching plane, or in observation of the ground, e.g., change in elevation in vegetation (which could characterize the condition of a grass strip runway) or an otherwise uniform background, e.g., the desert, can lead to material improvements in safety.

Combining results from maximally polarized imagery and images derived from other types of remote sensing, e.g., FLIR thermal imaging for moisture detection, can yield maps or images of very specific content. For example, on the golf course, the data from both could produce a map showing moisture, vegetation type, and undulation of the surface. Such imaging data fusion could be as simple as putting the two images on a common reference frame by applying simple arithmetic operations, e.g., dividing the pixels of one by the other, or more complex operation, e.g., mapping 2 or 3 standard deviations in local background from each image separately into a single resulting image that would highlight regions where both maps indicated deviations. The algorithm is a function of the particular characteristic under investigation. Thus, simple spectral filters, e.g., a notch filter that allows only a narrow spectral band to pass through without absorption, will present a different polarization digital image than will a notch filter placed over a different spectral region. Low-pass and high-pass spectral filters will similarly present different net correlation digital images with the polarization data, and so can yield better information on other physical conditions, particularly moisture. In another golf example of the advantages of combining data, the processed output of the polarized digital images in combination with the digital image output of range-finding cameras, can be input to an algorithm to choose a best path for a golfer to aim his shot on the green.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A device capable of creating, a sequence of digital images, said device comprising:
   a camera capable of taking said sequence of digital images;
   a polarizer attached to said camera;
   a rotator motor, said rotator motor capable of rotating said polarizer;
   a microprocessor capable of storing said sequence of digital images taken by said camera through said polarizer;
   wherein said sequence is comprised of 2*N digital images P(i), i=1 to 2*N, wherein each digital image P(i) represents an array of pixels; said sequence being taken at rotational angles of said polarizer between 0 degrees and 180 degrees in equal increments wherein N is an integer greater than 1, and i is an index of said sequence; and symbol * represents the multiplication function, and wherein said rotational angles are chosen so that sequences of digital images P(i) and P(i+N) are orthogonal polarization of light of the digital images, i=1 to N whereby said device being capable of providing net differences of orthogonal polarization of the digital images to a display.

2. The device of claim 1 being capable of
a) generating a sequence of difference digital images D(i)=P(i)−P(i+N), i=1 through N wherein said sequence of difference digital images D(i) being computed pixel by pixel;
b) generating a scalar sequence Q(i), i=1 to N where $$Q(i)=f(D(i))$$

where f( ) is a function defined by a user selected for a specific application of said device;
c) calculating integer I where I is digital image Q(I) where integer I is a maximum value of Q(i), i=1 to N.

3. The device of claim 2 wherein function f(i) is defined to be Q(i) where Q is defined as $$Q(i)=D(i,1,1)*D(i,1,1)+D(i,1,2)*D(i,1,2)+\ldots+D(i,R,S)*D(i,R,S)$$

where D(i) is digital array of R rows and S columns, and character * represents the multiplication symbol.

4. The device of claim 2 additionally comprising a display wherein said device being capable of displaying said D(i) on said display.

5. The device of claim 1 wherein said microprocessor capable of identifying a target and send coordinates of said target to an automated targeting system.

6. The device of claim 1 wherein said device is implemented in a smartphone.

7. The device of claim 1 where said camera has an optical element.

8. A device capable of creating sequences of digital images, said device comprising:
a first digital camera capable of taking a first sequence of an array of pixels of digital images P1(i), i=1 to N,
a second digital camera capable of taking a second sequence of an array of pixels of digital images P2(i), i=1 to N,
a first polarizer attached to said first digital camera;
a second polarizer attached to said second digital camera;
a first rotator motor attached to said first digital camera, said first rotator motor capable of rotating said first polarizer;
a second rotator motor attached to said second digital camera, said second rotator motor capable of rotating said second polarizer;
a first microprocessor capable of storing said first sequence of digital images taken by said first digital camera through said first polarizer;
a second microprocessor capable of storing said second sequence of digital images taken by said second digital camera through said second polarizer wherein said first microprocessor and said second microprocessor being capable of cooperatively synchronizing said first rotator motor and said second rotator motor whereby said device being capable of providing input data to a display and wherein a first sequence of N digital images P1(i), i=1 to N are acquired at rotational angles of said first polarizer between 0 degrees and 180 degrees in equal increments wherein N is an integer greater than 1, and;

a second sequence of N digital images P2(i), i=1 to N are taken wherein said rotational angles are chosen so that said sequences of digital images P1(i) and P2(i+N) are orthogonal polarization of light of said digital images, i=1 to N and said device being capable of
a) generating a sequence of difference digital images D(i)=P1(i)−P2(i+N), i=1 through N wherein said sequence of difference digital images D(i) being computed pixel by pixel;
b) generating a scalar sequence Q(i), i=1 to N where $$Q(i)=f(D(i))$$

where f( ) is a function defined by a user selected for a specific application of the device;
c) calculating integer I where I is a digital image QM where integer I is a maximum value of Q(i), i=1 to N whereby said device being capable of providing net differences of orthogonal polarization of the digital images to a display.

9. The device of claim 8 wherein function f(i) is defined to be Q(i) where Q is defined as $$Q(i)=D(i,1,1)*D(i,1,1)+D(i,1,2)*D(i,1,2)+\ldots+D(i,R,S)*D(i,R,S)$$

where D(i) is digital array of R rows and S columns, and character * represents the multiplication symbol.

\* \* \* \* \*